US011225007B2

(12) United States Patent
Kilian et al.

(10) Patent No.: US 11,225,007 B2
(45) Date of Patent: Jan. 18, 2022

(54) METHOD FOR MOVING A MOVABLE PLATEN

(71) Applicant: ENGEL AUSTRIA GmbH, Schwertberg (AT)

(72) Inventors: Friedrich Johann Kilian, Neuhofen/Krems (AT); Friedrich Pernkopf, Gramastetten (AT); Stephan Eppich, Arbing (AT)

(73) Assignee: ENGEL AUSTRIA GMBH, Schwertberg (AT)

( * ) Notice: Subject to any disclaimer, the term of this patent is extended or adjusted under 35 U.S.C. 154(b) by 508 days.

(21) Appl. No.: 16/165,558

(22) Filed: Oct. 19, 2018

(65) Prior Publication Data

US 2019/0118447 A1 Apr. 25, 2019

(30) Foreign Application Priority Data

Oct. 23, 2017 (AT) ............................. A 50887/2017
May 9, 2018 (AT) ............................. A 50386/2018

(51) Int. Cl.
*B29C 45/80* (2006.01)
*B29C 45/66* (2006.01)
(Continued)

(52) U.S. Cl.
CPC .............. *B29C 45/80* (2013.01); *B29C 45/64* (2013.01); *B29C 45/661* (2013.01); *B29C 45/76* (2013.01);
(Continued)

(58) Field of Classification Search
CPC ...................................................... B29C 45/80
See application file for complete search history.

(56) References Cited

U.S. PATENT DOCUMENTS

| 7,041,247 | B2 | 5/2006 | Nagaoka et al. |
| 7,168,946 | B2 | 1/2007 | Koike et al. |
| (Continued) | | | |

FOREIGN PATENT DOCUMENTS

| CN | 101166616 | 4/2008 |
| CN | 104802382 | 7/2015 |
| (Continued) | | |

OTHER PUBLICATIONS

English translation of JPH05269751 (Year: 1993).*

*Primary Examiner* — Larry W Thrower
(74) *Attorney, Agent, or Firm* — Wenderoth, Lind & Ponack, L.L.P.

(57) ABSTRACT

A method for moving a movable mold mounting plate of a molding machine, wherein the movable mold mounting plate is movable relative to a stationary mold mounting plate and the mold mounting plates are kinematically connected to each other, wherein molding tool parts arranged on the mold mounting plates are brought into abutment to each other in a closed state and wherein the movable mold mounting plate is moved by a drive mechanism and/or the stationary mold mounting plate is moved by an injection device such that, when reaching a predeterminable distance of the mold mounting plates relative to each other, a parameter representing a tilting movement of the mold mounting plates relative to each other is less than or equal to a presettable value.

11 Claims, 5 Drawing Sheets

(51) Int. Cl.
*B29C 45/76* (2006.01)
*B29C 45/64* (2006.01)
*B29C 45/17* (2006.01)

(52) U.S. Cl.
CPC .. *B29C 45/7653* (2013.01); *B29C 2045/1788* (2013.01); *B29C 2945/76093* (2013.01); *B29C 2945/76227* (2013.01); *B29C 2945/76387* (2013.01); *B29C 2945/76578* (2013.01); *B29C 2945/76581* (2013.01); *B29C 2945/76595* (2013.01); *B29C 2945/76705* (2013.01); *B29C 2945/76866* (2013.01)

(56) References Cited

U.S. PATENT DOCUMENTS

| | | |
|---|---|---|
| 2004/0012122 A1 | 1/2004 | Nagaoka et al. |
| 2005/0017003 A1 | 8/2005 | Koike et al. |
| 2008/0017403 A1 | 7/2008 | Glaesener et al. |
| 2009/0011064 A1 | 1/2009 | Satou |

FOREIGN PATENT DOCUMENTS

| | | |
|---|---|---|
| CN | 106863730 | 6/2017 |
| DE | 298 11 214 | 9/1998 |
| DE | 10 2005 004 136 | 9/2005 |
| DE | 10 2007 050 954 | 4/2009 |
| DE | 10 2009 040 434 | 5/2010 |
| DE | 102 94 862 | 7/2010 |
| DE | 10 2015 012 216 | 4/2016 |
| EP | 3 067 181 | 9/2016 |
| JP | 61-261017 | 11/1986 |
| JP | 5-269751 | 10/1993 |
| JP | 2012-245744 | 12/2012 |
| WO | 2017/024381 | 2/2017 |

\* cited by examiner

METHOD FOR MOVING A MOVABLE PLATEN

BACKGROUND OF THE INVENTION

1. Field of the Invention

The present invention concerns (according to a first variant) a method for moving a movable mold mounting plate of a molding machine and a molding machine.

2. Description of the Related Art

In the case of a generic molding machine, in particular an injection molding machine for the production of plastic parts made of plastic melt, the movable mold mounting plate and the stationary mold mounting plate are kinematically connected to each other, for example by means of guiding tie bars (in the case of so-called three-platen machines), by means of tension tie bars (in the case of so-called two-platen machines) or by means of a machine frame which transmits closing forces (in the case of so-called tie bar-less machines). When moving the movable mold mounting plate, thus, a tilting of the mold mounting plates to each other occurs by the forces generated when accelerating or braking. The tilting is primarily caused by a tilting movement carried out by the stationary mold mounting plate.

The document EP 3 067 181 A1 describes a generic method, in the case of which the movable mold mounting plate is moved with a predetermined acceleration.

The US 2008/0174038 A1 describes that tilting effects occur during the movement of the movable mold mounting plate to the stationary mold mounting plate. In order to prevent this tilting effect, anti-tilt apparatuses are provided. These anti-tilt apparatuses react to control signals which, in turn, are controlled depending on level sensors. These sensors are provided on the movable mold mounting plate as well as on the stationary mold mounting plate. Additionally, also pressure sensors are provided which allow conclusions regarding the acceleration of the plate. Among others, it is disadvantageous with this device that an expensive additional anti-tilt apparatus has to be provided.

Something similar applies for the DE 102 94 862 B4, wherein the one movable plate is tilted relative to the stationary plate during the travel movement. This tilting is correct by using complex parallelism maintaining mechanisms. In particular, rod elements are used.

For the production of molded parts in a molding tool—which is formed by molding tool parts mounted to the mold mounting plates—it is necessary to move the movable mold mounting plate into a predefined distance (so-called closed state) to the stationary plate, in which the molding tool parts reach a (mold) abutting position to each other so that a closing force can be applied to the molding tool parts via the mold mounting plates by means of a closing force mechanism. The closing force mechanism can be formed by the drive mechanism for the movable mold mounting plate or can be formed separate from this drive mechanism.

In order to ensure that the molding tool parts reach a correct abutting position, often at least one of the molding tool parts comprise at least one guide bolt which enters a guide bore arranged in the other molding tool part shortly before reaching the closed state. If the mold mounting plates are not oriented parallel to each other (before the generating of the closing force the parallel position of the mold mounting plates mostly corresponds to a vertical orientation of the mold mounting plates in the space), an increased abrasion or even a damage of the at least one guide bolt can occur.

SUMMARY OF THE INVENTION

The object of the (first variant of the) invention is to provide a method for moving a movable mold mounting plate of a molding machine and a molding machine which prevent the disadvantages occurring in the state of the art. In particular, an increased abrasion (wear) or a damage of the guide bolts of the molding tool and/or of the molding tool itself shall be avoided.

This object is solved by a method and with a molding machine according to the present disclosure. A preferred example for a molding machine is an injection molding machine for the production of plastic parts made of plastic melt.

Since the (i) movable mold mounting plate is moved by the drive mechanism and/or (ii) the stationary mold mounting plate is moved by an injection device in such a way that when reaching a predeterminable distance of the mold mounting plates relative to each other a parameter representing the tilting movement of the mold mounting plates relative to each other is less than or equal to a presettable value, preferably equal to zero, an excessive inclination (i.e. a deviation from the parallel position) of the mold mounting plates relative to each other is prevented. Ideally, a parallel position of the mold mounting plates can be reached when the mold mounting plates are in the predetermined distance to each other. The guide bolts are not damaged and an excessive wear is avoided.

Thus, no additional and expensive device has to be provided by way of which the tilting is compensated or corrected, but the tilting movement is prevented or adjusted to a presettable value by the already present drive mechanism itself or by the already present injection device abutting the stationary mold mounting plate. In other words, (only) this drive mechanism, by way of which the closing and opening movement of the movable mold mounting plate can be carried out, is used for the adjustment of the tilting movement of the mold mounting plates to each other.

In, again, other words the mechanism (the actuating system) for executing the closing movement and/or the mechanism (the actuating system) for pressing the injection device to the stationary mold mounting plate are/is simultaneously used as mechanism for compensating the tilting movement.

The invention selects the movement of the movable mold mounting plate in such a way that the mold mounting plates in the tilting movement—which can be modelled by an oscillation—when being located at the predetermined distance (this distance for example can have the value zero) are just in a situation in which the mold mounting plates are at least approximately parallel to each other (or with an inclination less than the presettable value), wherein the presettable value of the parameter representing the tilting movement of the mold mounting plates relative to each other (e.g. a relative angle between the mold mounting plates or an absolute angle relative to a reference system) indicates how large the deviation from the parallel location is allowed to be. The oscillation, thus, is just at a zero crossing (if the presettable value is zero) or close to the zero crossing. Therefore, the invention provides a regulation of the movement of the movable mold mounting plate in dependence on the oscillation movement primarily carried out by the stationary mold mounting plate.

It can be provided that the movable mold mounting plate is moved by the drive mechanism in accordance with a corrected target path and/or in accordance with changed commands for the drive mechanism, wherein the corrected target path and/or the changed commands for the drive mechanism result from:

a target path for the movable mold mounting plate, in which preferably the occurring tilting movement of the mold mounting plates to each other is minimized, and a correction of the target path and/or a change of commands for the drive mechanism, which correction—taking into consideration the tilting movement of the mold mounting plates to each other—guarantee or guarantees that when reaching the predeterminable distance of the mold mounting plates to each other the parameter representing the tilting movement of the mold mounting plates to each other is less than or equal to the presettable value.

The correction of the target path and/or the change of commands for the drive mechanism are carried out or is carried out (by the controlling or regulating device) either in real time or in accordance with a preliminarily generated movement profile for the movable mold mounting plate. The preliminarily generated movement profile can be determined in a test run or in a production cycle of the mold mounting machine.

The pressing force of the injection device onto the stationary mold mounting plate can be adjusted in dependence on the parameter representing the tilting movement of the mold mounting plates to each other. Especially, the injection device is accelerated in such a way that the tilting of the stationary mold mounting plate is minimized.

Figure 1:
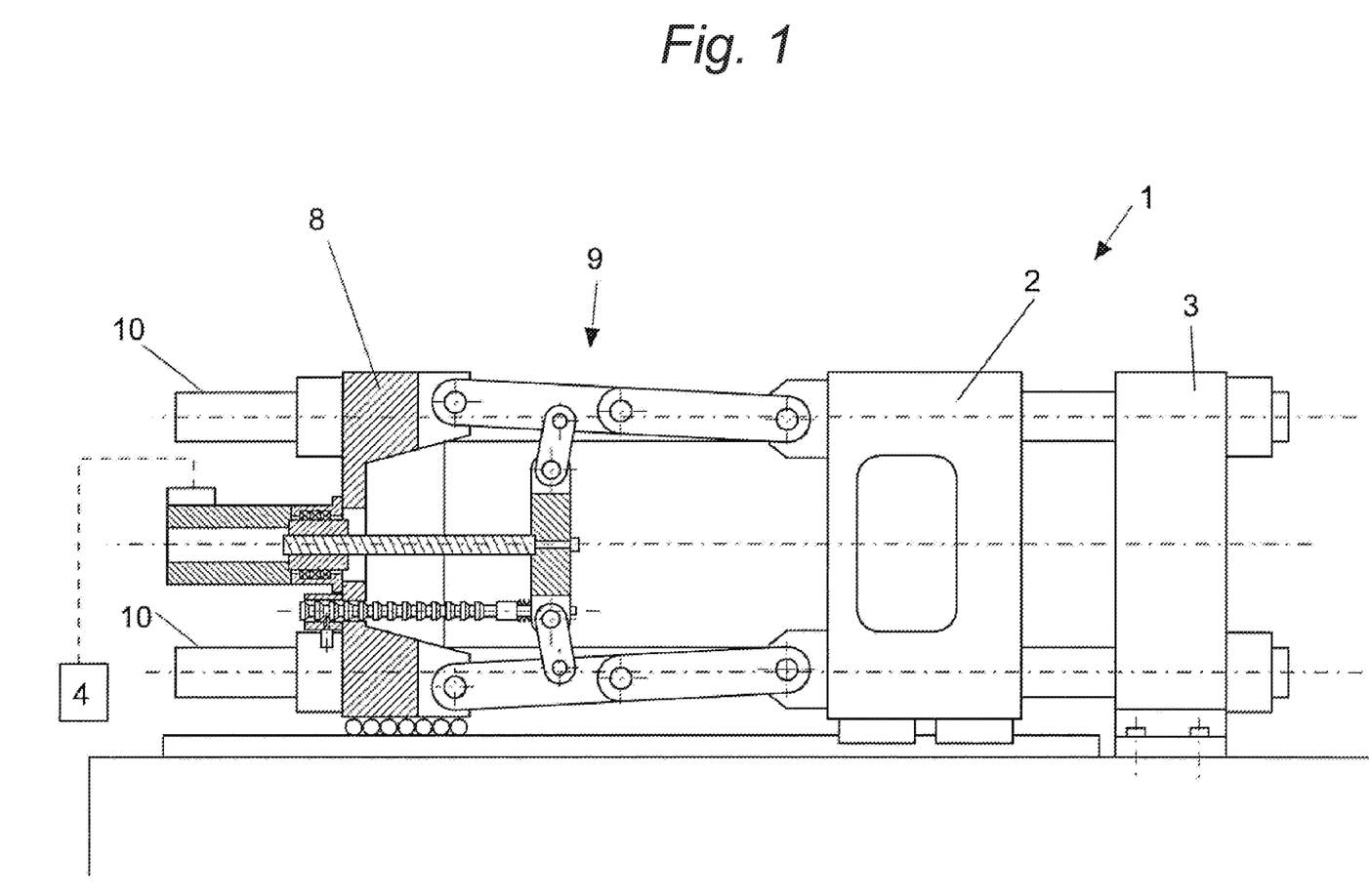
FIG. 1 is a schematic lateral view of a molding machine.
Figure 2:
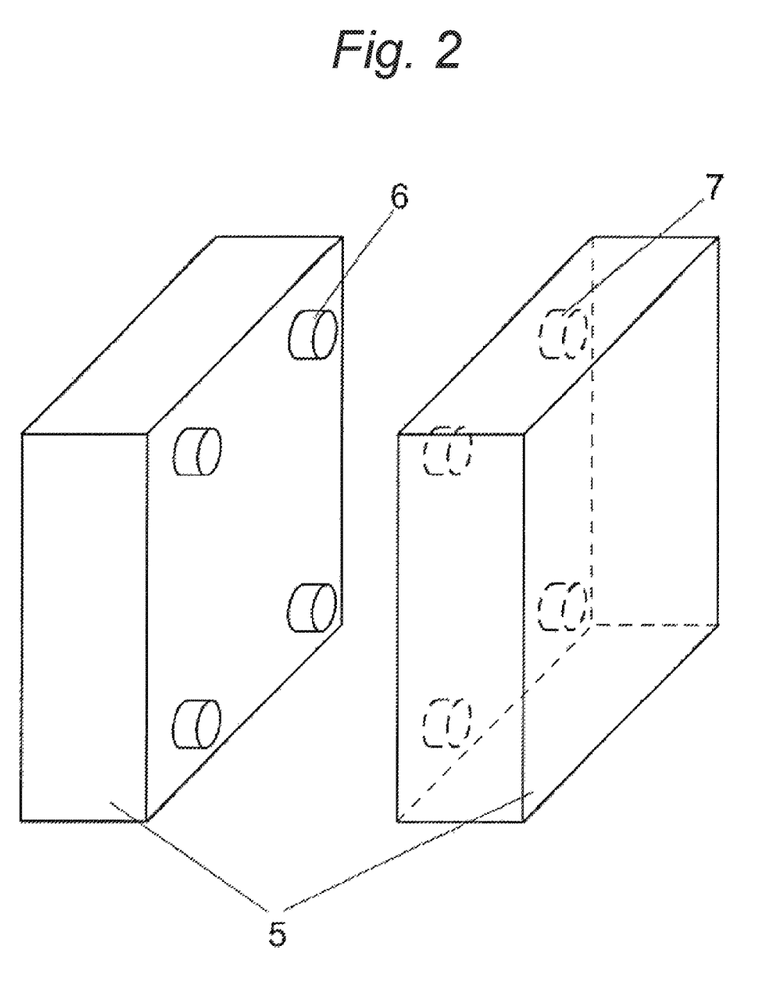
FIG. 2 is a schematic perspective view of a molding tool of molding machine illustrated in FIG. 1.

An exemplary embodiment of the (first variant of the) invention is discussed based on the FIGS. 1 and 2. The invention is not limited to the illustrated three-platen machine with a toggle lever mechanism, but can be used for example also with another movement mechanism or with another type of machine (e. g. a two-platen machine).

The present invention concerns (according to a second variant) a molding machine, in particular an injection molding machine ore an injection press, comprising a machine frame with a longitudinal axis of the molding machine, a stationary mold mounting plate arranged on the machine frame, wherein the stationary mold mounting plate has a rectangular orientation relative to the longitudinal axis of the molding machine, a movable mold mounting plate being movable relative to the machine frame, wherein the movable mold mounting plate has a rectangular orientation relative to the longitudinal axis of the molding machine, a drive device for moving the movable mold mounting plate, and at least two, preferably four, guiding tie bars which penetrate the mold mounting plates. In addition, the invention concerns a method for operating such a molding machine.

Very high forces are acting onto the individual components of the molding machine when operating the molding machine. Since a molding machine is not (and cannot even be) "infinitely" rigid, deformations and bendings of at least individual components occur when forces are acting upon the components. Even if these deformations and bendings are very small, such deformations can lead to quality problems or to wear of the molding machine and of the molding tool.

The DE 10 2015 012 216 A1 shows a method for determining the relative distance and/or the orientation of relatively movable molding tool parts mounted to different mold mounting plates of a mold closing unit. During an injection-compression process the position values detected by distance measurement sensors are corrected based on force values (which are detected by force sensors provided too) taking into account the determined table of deformations values. The result is a very precise knowledge of the actual parallelism of the stamping gap in the injection-compression molding tool (or if necessary of the non-parallel orientation of the molding tool parts to each other) without the necessity of additional sensors. For determining deformations, alternatively, suitable sensors like strain gauges or similar can be attached to machine elements which are subject to a deformation when closing forces are acted upon. It is guaranteed that the determined molding tool gap corresponds to the actual molding tool gap. This document, thus, is only intended to carry out deformation measurements during the application of the closing force. The travelling movement of the mold mounting plates to each other is already finished.

In the case of classic (4-tie bars) injection molding machines, the stationary molding mounting plate is usually screwed to the machine frame. The occurring forces (acceleration, braking), however, are generated in or along the longitudinal axis of the molding machine, which leads to a slight tilting of the stationary mold mounting plate relative to the machine frame. Determined by the system, also the front plate and the movable mold mounting plate are then tilted similar to a parallelogram, as these plates are indeed connected via tie bars and a drive device (closing system).

In order to minimize this tilting, the machine frames are usually constructed very rigid. However, there are also systems which take on the forces in the machine axis with other, additional structural elements and which transmit the forces into the machine frame separate from the mold mounting plate. These variants, however, are relative complex and expensive.

The object of the (second variant of the) present invention, thus, is to provide an improved molding machine and an improved method compared to the state of the art. In particular, the mentioned disadvantages shall be avoided.

This is solved by a molding machine according to the present disclosure. According to the invention, thus, there is provided a detecting device for detecting a value which represents a tilting of at least one of the mold mounting plates from the rectangular orientation relative to the longitudinal axis of the molding machine during a travelling movement of the movable mold mounting plate. Such a travelling movement takes place during the fast stroke and, thus, before reaching the closed position (hence before the molding tool parts are abutting each other). In addition there are provided a comparing unit for comparing the value representing the tilting with a comparative value and an output device for outputting an exceeding signal when the value representing the tilting reaches or exceeds the comparative value. Therefore, it is possible on the one hand to detect the tilting of the mold mounting plates and on the other hand, when the tilting is too strong, to carry out a corresponding correction, so that the quality of the molded parts is not adversely affected by a too strong deformation.

According to a preferred exemplary embodiment it is provided that the detecting device comprises at least one sensor, preferably a force sensor, an acceleration sensor, a sonic sensor or an optic sensor, for detecting the value representing the tilting.

Further it is preferably provided that the at least one sensor is mounted to the stationary mold mounting plate, to a front plate, to the machine frame and/or to the drive device.

For a simple operation of the molding machine, preferably an operating unit is provided, wherein the operating unit comprises a screen and an input device.

Further, preferably a controlling or regulating device (open-loop or closed-loop control unit) can be provided, wherein the detecting device, the comparing device and the output device are part of the controlling or regulating device or are connected in a signal-transmitting manner to the controlling or regulating device. The controlling or regulating device can also be defined as.

Depending on the molding tool size (weight) and the setting of the velocities and ramps, a certain tilting is created during acceleration and braking. Essential, however, is in particular the braking before diving into the molding tool guides. This region is known because of the given molding tool height. The section of the travelling movement corresponding to the diving into the guides can either be inputted additionally or can be "learned" or detected in test runs by the attached sensor. Especially this is the region which has to be measured and checked concerning the tilting. In this region, then, either only one predetermined tilting is permitted or a cautious approach to a permitted value is carried out by test runs. If the sensor triggers (thus the permitted tilting is exceeded), either a warning is outputted or the controlling or regulating device automatically adjusts the braking ramp so that the permitted value is no longer exceeded in the next cycle.

According to a preferred exemplary embodiment it is thus provided that the detection of the value representing the tilting is carried out, preferably only, during a braking movement of the movable mold mounting plate when closing.

Moreover, it is preferably provided that the exceeding signal can be outputted to the controlling or regulating device, wherein depending on the exceeding signal an adjustment of the braking movement for the movable mold mounting plate for the next cycle is carried out by the controlling or regulating device.

Alternatively, it can also be provided that the exceeding signal can be outputted as a warning signal, preferably via the screen of the operating unit. Thereby, the decision about adaptations or changes possibly to be carried out are entrusted to the operator.

Protection is also sought for a method for operating a molding machine. According to the invention, thus, there are provided the steps detecting a value which represents a tilting of at least one of the mold mounting plates from the rectangular orientation relative to the longitudinal axis of the molding machine during a travelling movement of the movable mold mounting plate, comparing the value representing the tilting with a comparative value, and outputting an exceeding signal when the value representing the tilting reaches or exceeds the comparative value.

All preferred exemplary embodiments concerning the molding machine apply mutatis mutandis also for the method.

BRIEF DESCRIPTION OF THE DRAWINGS

Further details and advantages of the present invention are described more fully hereinafter by means of the specific description with reference to the embodiments illustrated in the drawings, in which.

DETAILED DESCRIPTION OF THE INVENTION

In general, the FIGS. 1 and 2 correspond to the first variant of the invention and the FIGS. 3 to 6 correspond to the second variant of the present invention. Of course, hybrid forms are possible too.

FIG. 1 shows a molding machine 1 which is here formed as a three-platen injection molding machine comprising a movable mold mounting plate 2, a stationary mold mounting plate 3, a front plate 8 and guiding tie bars 10. A toggle lever mechanism 9 arranged between the front plate 8 and the movable mold mounting plate 2 is here provided as a combined drive and closing force mechanism. This toggle lever mechanism 9 is controlled or regulated by a controlling or regulating device 4 for driving the movable mold mounting plate 2. Measurement values which are representative for the movement of the movable mold mounting plate 2 (e. g. position and/or velocity and/or acceleration of the movable mold mounting plate 2 or of a part of the toggle lever mechanism 9, e. g. a crosshead) can be determined by sensors 26 (of a detection device 23) which are not shown in FIG. 1 and can be transmitted to the controlling or regulating device 4. Also a sensor 26 for detecting the tilting movement of the stationary mold mounting plate 3 can be provided, the signals of which are transmitted to the controlling or regulating device 4. These signals can be used for a regulation of the tilting movement of the stationary mold mounting plate 3 in real time.

In the case of a molding machine 1 of the present exemplary embodiment, the stationary mold mounting plate 3 is kinematically connected to the movable mold mounting plate 2 by means of guiding tie bars 10 functioning as tension rods.

The stationary mold mounting plate 3 is fixed on one side to a machine frame 11 of the molding machine 1 and can be modelled for example as a beam clamped on one side.

The tilting movement can be modelled e. g. using a dynamic equivalent model and a Ritz method which start from an elastic degree of freedom for the stationary mold mounting plate 3 and from fixed coordinates. Such a modelling was described by the applicant with respect to a handling device in the paragraphs 33 to 50 of the DE 10 2009 040 434 B1, wherein the disclosure content of this document is incorporated into the present application.

In the present case the equivalent mass is assembled by a term for the movable mold mounting plate 2 and a term for the molding tool part 5 arranged on the movable mold mounting plate 2 (each as a rigid and elastic part). In the ordinary time-dependent differential equation for the tilting movement of the stationary mold mounting plate 3, which equation results via the Ritz method, the movement of the movable mold mounting plate 2 (either directly or e. g. via the position of the crosshead) is entered as excitation term. This differential equation can be reduced by inversion in such a way that a solution is carried out to reach a parameter representing the tilting movement of the mold mounting plates 2, 3 to each other. Therefore, the tilting movement is completely described in its time-dependency and is available for the controlling or regulating device 4 in order to control or regulate the movement of the movable mold mounting plate 2.

A target profile for the movement of the movable mold mounting plate 2, which target profile is minimizing the tilting movement of the stationary mold mounting plate 3, can be created or can be carried out by means of a pre-control of the fix coordinates of the Ritz method.

As the amplitude of the tilting movement is extremely small, it is possible that—as described in paragraph of the DE 10 2009 040 434 B1—a linearization of the movement equation is carried out along a Rigid-Body solution. This simplifies the calculation.

FIG. 2 shows a detailed illustration of a molding tool 17 with two molding tool parts 5, wherein guide bolts 6 are arranged on one molding tool parts 5 and guide bores 7 corresponding to the guide bolts 6 are arranged on the other molding tool part 5.

Figure 3:
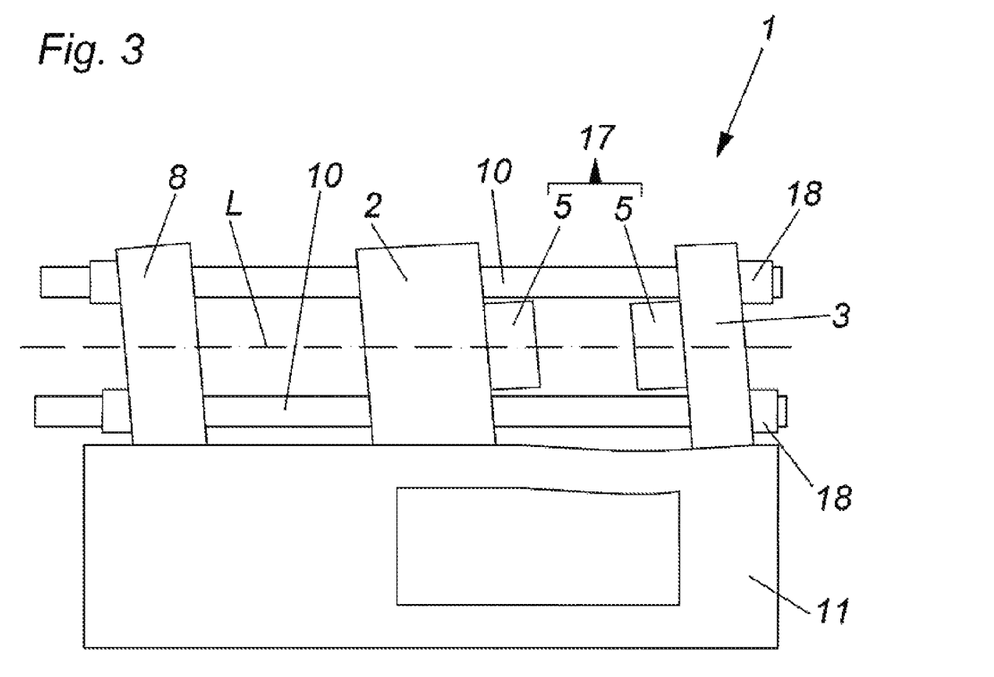
FIG. 3 is schematic lateral view of a molding machine with an exaggerated illustrated tilting to the left.

FIG. 3 shows a molding machine 1 in the form of a three-platen injection molding machine. The front plate 8 and the stationary mold mounting plate 3 are attached to the machine frame 11. The movable mold mounting plate 2 is movably supported on the machine frame 11 and is movable along the longitudinal axis L of the molding machine 1. In this case, the drive device 15 for the movable mold mounting plate 2 is not illustrated. This drive device 15 can be formed for example as a toggle lever mechanism (preferably driven by a spindle). The plates 8, 2 and 3 are penetrated by guiding tie bars 10. Molding tool parts 5 are mounted to each of the two mold mounting plates 2 and 3. The molding tool parts 5 together build the molding tool 17. The tie bar nuts are referred to with the reference sign 18.

Figure 4:
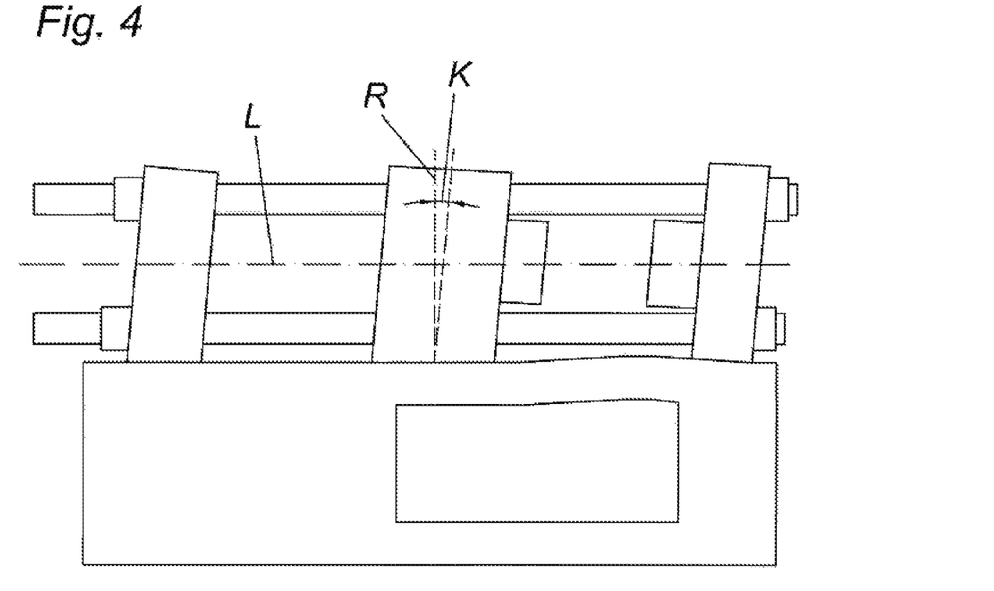
FIG. 4 is a schematic lateral view of a molding machine with an exaggerated illustrated tilting to the right.

The front plate 8 and the two mold mounting plates 2 and 3 have (without load) a rectangular orientation R relative to the longitudinal axis L of the molding machine 1. Depending on the size and weight of the molding tool 17 and on the setting of the velocities, a certain tilting of the mold mounting plate 2 occurs when accelerating and braking the movable mold mounting plate 2. This tilting is illustrated in a strongly exaggerated manner in each of the FIGS. 3 and 4. For an illustrative purpose, the rectangular orientation R of the movable mold mounting plate 2 to the longitudinal axis L of the molding machine 1 is indicated in FIG. 4. Additionally, the value K (in the form of a tilting angle) representing the tilting is illustrated. The movable mold mounting plate 2 is tilted (in this case to the right) relative to the longitudinal axis L of the molding machine 1 and to the machine frame 11.

Figure 5:
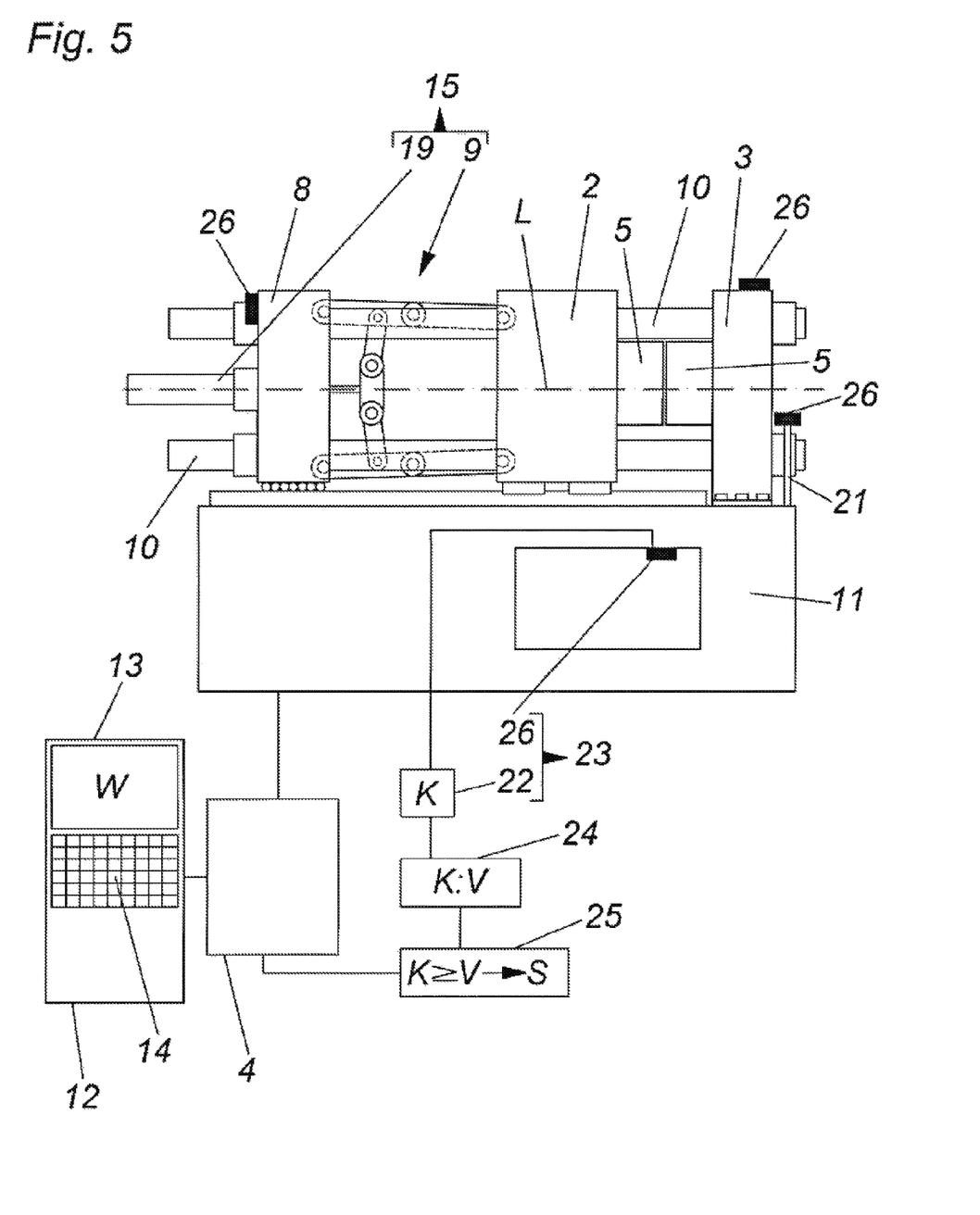
FIG. 5 is a schematic view of a molding machine with sensors of the detection device which are attached on different positions.

FIG. 5 shows a molding machine 1 without illustrating the tilting of the plates in an exaggerated manner. Also this molding machine 1 comprises a machine frame 11, the stationary mold mounting plate 3, the movable mold mounting plate 2 and the front plate 8. In addition, guiding tie bars 10 are provided. The drive device 15 comprises a drive spindle 19 and a toggle lever mechanism 9 movable by the drive spindle 19.

Several possible places or locations for the mounting of a sensor 26 of a detection device 23 are illustrated in FIG. 5. Such a sensor 26 can be arranged on the front plate 8, on the stationary mold mounting plate 3, on a separately provided holding device 21 (e. g. in form of a bracket) and/or on the machine frame 11. The sensor 26 transmits a corresponding sensor value to an evaluation unit 22. The evaluation unit 22 together with the sensor 26 forms the detection device 23 for detecting a value K which represents a tilting of at least one of the mold mounting plates 2, 3 from the rectangular orientation R relative to the longitudinal axis L of the molding machine 1 during a travelling movement of the movable mold mounting plate 2. In addition, a comparing unit 24 for comparing the value K representing the tilting with a comparative value V is provided. The comparative value V for example can be stored in a memory or can be deduced from previous cycles. Further, an output device 25 for outputting an exceeding signal S is provided. The exceeding signal S is outputted when the value K representing the tilting reaches or exceeds the comparative value V.

The molding machine 1 comprises a controlling or regulating device 4. Several movements and processes are controlled or regulated with this controlling or regulating device 4. The controlling or regulating device 4 is connected in a signal-transmitting manner with an operating unit 12. The operating unit 12 comprises a screen 13 and an input device 14. The detection device 23, the comparing unit 24 and the output device 25, in the shown embodiment, are connected with the controlling or regulating device 4 in a signal-transmitting manner.

According to a first variant it is provided that the exceeding signal S can be transmitted to the controlling or regulating device 4, wherein depending on the exceeding signal S an adjustment of the braking movement for the movable mold mounting plate 2 for the next cycle is carried out by the controlling or regulating device 4. Alternatively (or additionally) it can be provided that the exceeding signal S can be outputted as a warning signal W, for example acoustically or optically via the screen 13 of the operating unit 12.

Figure 6:
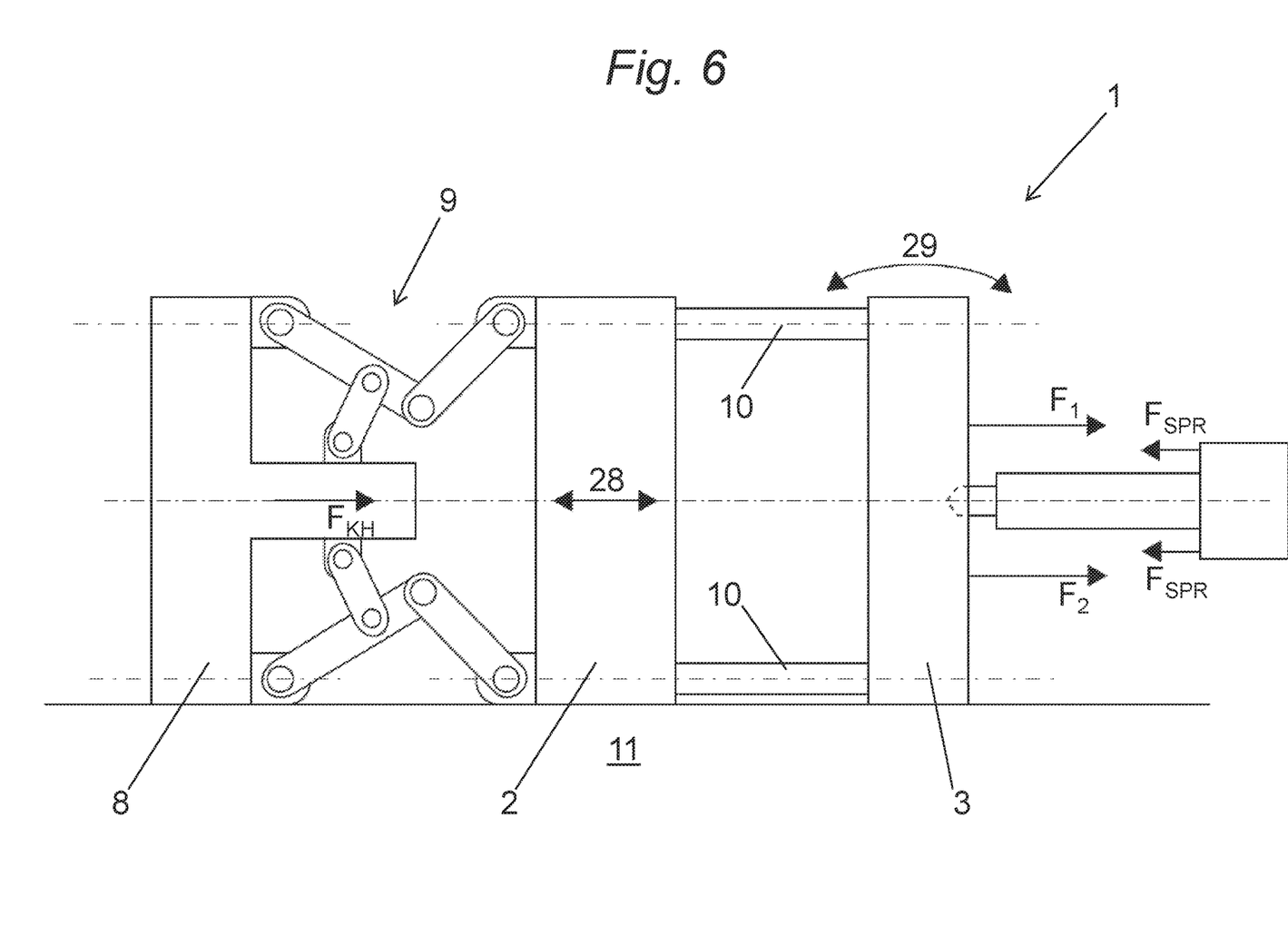
FIG. 6 is a schematic lateral view of a molding machine.

FIG. 6 shows a molding machine 1 which is formed as a three-platen injection molding machine with a movable mold mounting plate 2, a stationary mold mounting plate 3, a front plate 8 and guiding tie bars 10. A toggle lever mechanism 9 arranged between the front plate 8 and the movable mold mounting plate 2 is here provided as a combined drive and closing force mechanism. This toggle lever mechanism 9 for example (like in FIG. 1) is controlled or regulated by a controlling or regulating device 4 for driving the movable mold mounting plate 2. Measurement values which are representative for the movement of the movable mold mounting plate 2 (e. g. position and/or velocity and/or acceleration of the movable mold mounting plate 2 or of a part of the toggle lever mechanism 9, e. g. a crosshead) can be determined by sensors 26 (of a detection device 23) which are not shown and can be transmitted to the controlling or regulating device 4. Also a sensor 26 for detecting the tilting movement of the stationary mold mounting plate 3 can be provided, the signals of which are transmitted to the controlling or regulating device 4. These signals can be used for a regulation of the tilting movement of the stationary mold mounting plate 3 in real time.

The stationary mold mounting plate 3 on one side is mounted to a machine frame 11 of the molding machine 1. The injection device 27 is abutting the stationary mold mounting plate 3 on a side facing away from the movable mold mounting plate 2. This injection device 27 is pressed to the stationary mold mounting plate 3 with a pressing force $F_{SPR}$ by actuating elements (not shown here) in a conventional manner.

Depending on the size and weight of the molding tool 17 and on the setting of the velocities, a certain tilting of the mold mounting plate 2 and, thus, also of the stationary mold mounting plate 3 (illustrated by the movement arrow 29) occurs when accelerating and braking (here illustrated by the movement arrow 28) the movable mold mounting plate 2. The tilting is generated by the driving force $F_{KH}$ applied by the toggle lever mechanism 9.

By the tilting of the stationary mold mounting plate 3 a modification of the bearing forces $F_1$, $F_2$ occurs, which counteract the pressure force $F_{SPR}$ of the injection device 27.

In order to counteract a tilting of the stationary mold mounting plate 3 and of the movable mold mounting plate 2 connected therewith, the pressure force $F_{SPR}$ of the injection device 27 can be controlled or regulated to such an amount that the tilting is minimized or prevented. This can be carried out also by taking advantage of the inertia forces of the injection device 27 in that case when the nozzle of the injection device 27 is lifted from the stationary mold mounting plate 3. The bearing forces $F_1$, $F_2$ are then modified by a dynamic proportion.

LIST OF REFERENCE SIGNS 1 molding machine
2 movable mold mounting plate
3 stationary mold mounting plate
4 controlling or regulating device
5 molding tool parts
6 guide bolt
7 guide bore
8 front plate
9 toggle lever mechanism
10 guiding tie bars
11 machine frame
12 operating unit
13 display screen
14 input device
15 drive device
17 molding tool
18 tie bar nuts
19 drive spindle
21 holding device
22 evaluation unit
23 detection device
24 comparing unit
25 output device
26 sensor
27 injection device
28 movement arrow
29 movement arrow
$F_{SPR}$ pressure force
$F_{KH}$ driving force
$F_1$ bearing forces
$F_2$ bearing forces
L longitudinal axis of the molding machine
R rectangular orientation
K value representing the tilting
V comparative value
S exceeding signal
W warning signal

The invention claimed is:

1. A molding machine, comprising:
a stationary mold mounting plate;
a movable mold mounting plate which is movable relative to the stationary mold mounting plate;
a drive mechanism for moving the movable mold mounting plate;
a controlling or regulating device;
an injection device; and
a first molding tool part on the stationary mold mounting plate and a second molding tool part on the movable mold mounting plate, the first molding tool part and the second molding tool part being configured to be brought into abutment to each other in a closed state, wherein:
the stationary mold mounting plate and the movable mold mounting plate are kinematically connected to each other;
the drive mechanism is configured to be controlled or regulated by the controlling or regulating device;
the controlling or regulating device is configured to move the movable mold mounting plate by the drive mechanism and/or the stationary mold mounting plate by the injection device such that, when reaching a predeterminable distance of the stationary mold mounting plate and the movable mold mounting plate relative to each other, a parameter representing a tilting movement of the stationary mold mounting plate and the movable mold mounting plate relative to each other is less than or equal to a presettable value;
the predeterminable distance of the stationary mold mounting plate and the movable mold mounting plate relative to each other is configured such that at least one guide bolt of the first molding tool part enters into at least one guide bore defined in the second molding tool part before reaching the closed state; and
the drive mechanism is configured to move the movable mold mounting plate in accordance with a corrected target path and/or changed commands for the drive mechanism,
wherein the corrected target path and/or the changed commands for the drive mechanism result from:
a target path for the movable mold mounting plate;
a correction of the target path for the movable mold mounting plate and/or a change of commands for the drive mechanism, whereby the correction—taking into consideration the tilting movement of the stationary mold mounting plate and the movable mold mounting plate relative to each other—guarantees that, when reaching the predeterminable distance of the stationary mold mounting plate and the movable mold mounting plate relative to each other, the parameter representing the tilting movement of the stationary mold mounting plate and the movable mold mounting plate relative to each other is less than or equal to the presettable value; and
the drive mechanism is configured to move the movable mold mounting plate between an open position and a position before reaching the closed state in accordance with the corrected target path and/or the changed commands for the drive mechanism equal to the presettable value.

2. The molding machine according to claim 1, wherein the stationary mold mounting plate and the movable mold mounting plate are configured such that a temporally changeable tilting movement of the stationary mold mounting plate and the movable mold mounting plate relative to each other occurs by movement of the movable mold mounting plate.

3. The molding machine according to claim 2, wherein a relative angle between the stationary mold mounting plate and the movable mold mounting plate is the parameter representing the tilting movement of the stationary mold mounting plate and the movable mold mounting plate relative to each other.

4. The molding machine according to claim 2, wherein the predeterminable distance of the stationary mold mounting plate and the movable mold mounting plate relative to each other is zero.

5. The molding machine according to claim 2, wherein the molding machine is configured to measure the temporally changeable tilting movement of the stationary mold mounting plate and the movable mold mounting plate relative to each other.

6. The molding machine according to claim 1, wherein the drive mechanism is configured to perform the correction of the target path and/or the change of commands either in real time or in accordance with a preliminarily generated movement profile for the movable mold mounting plate.

7. The molding machine according to claim 2, wherein the molding machine is configured to perform an automatic determination of the predeterminable distance of the stationary mold mounting plate and the movable mold mounting plate relative to each other.

8. The molding machine according to claim 1, further comprising a sensor for detecting the tilting movement of the stationary mold mounting plate and the movable mold mounting plate relative to each other, wherein the sensor is configured to transmit signals of the sensor to the controlling or regulating device.

9. The molding machine according to claim 1, wherein the presettable value is equal to zero.

10. The molding machine according to claim 1, wherein the molding machine is configured to minimize the tilting movement of the stationary mold mounting plate and the movable mold mounting plate relative to each other in the target path for the movable mold mounting plate.

11. The molding machine according to claim 5, wherein the molding machine is configured to display the temporally changeable tilting movement of the stationary mold mounting plate and the movable mold mounting plate relative to each other.

* * * * *